United States Patent [19]
Lewis

[11] 3,952,982
[45] Apr. 27, 1976

[54] ALL ANGLE CAMERA MOUNT WITH VERNIER ADJUSTMENT

[76] Inventor: David P. Lewis, Box 20, Herold Rte. 1, Sutton, W. Va. 26601

[22] Filed: Jan. 7, 1975

[21] Appl. No.: 539,073

[52] U.S. Cl. ............................ 248/124; 248/183; 248/287; 354/81; 354/293
[51] Int. Cl.² ........................................ A47G 29/00
[58] Field of Search .......... 248/124, 125, 177, 178, 248/179, 183, 184, 185, 186, 286, 287, 298; 354/293, 294, 81

[56] References Cited
UNITED STATES PATENTS

| | | | |
|---|---|---|---|
| 2,535,722 | 12/1950 | Cooke | 248/124 |
| 2,599,269 | 6/1952 | Markle | 354/81 |
| 2,624,252 | 1/1953 | Judd | 248/286 |
| 2,755,053 | 7/1956 | Sloane | 354/293 |
| 2,990,764 | 7/1961 | Wilder | 354/81 |
| 3,133,719 | 5/1964 | Beck | 354/293 |
| 3,188,028 | 6/1965 | Waller | 248/286 |
| 3,730,469 | 5/1973 | Shields | 248/287 |
| 3,776,494 | 12/1973 | Baucheron | 354/81 |

Primary Examiner—Roy D. Frazier
Assistant Examiner—Robert A. Hafer
Attorney, Agent, or Firm—John R. Hanway

[57] ABSTRACT

This device consists primarily of an externally threaded mast which is adaptable to fit the mast mount of a U-shaped ground spike, a flat table, or a tri-pod. The device consists of various arms and brackets which are elevatable and may be moved forward and backward and will rotate 360°, the device including a vernier adjustment which will enable the camera to be moved forward and backward for fine focus.

1 Claim, 6 Drawing Figures

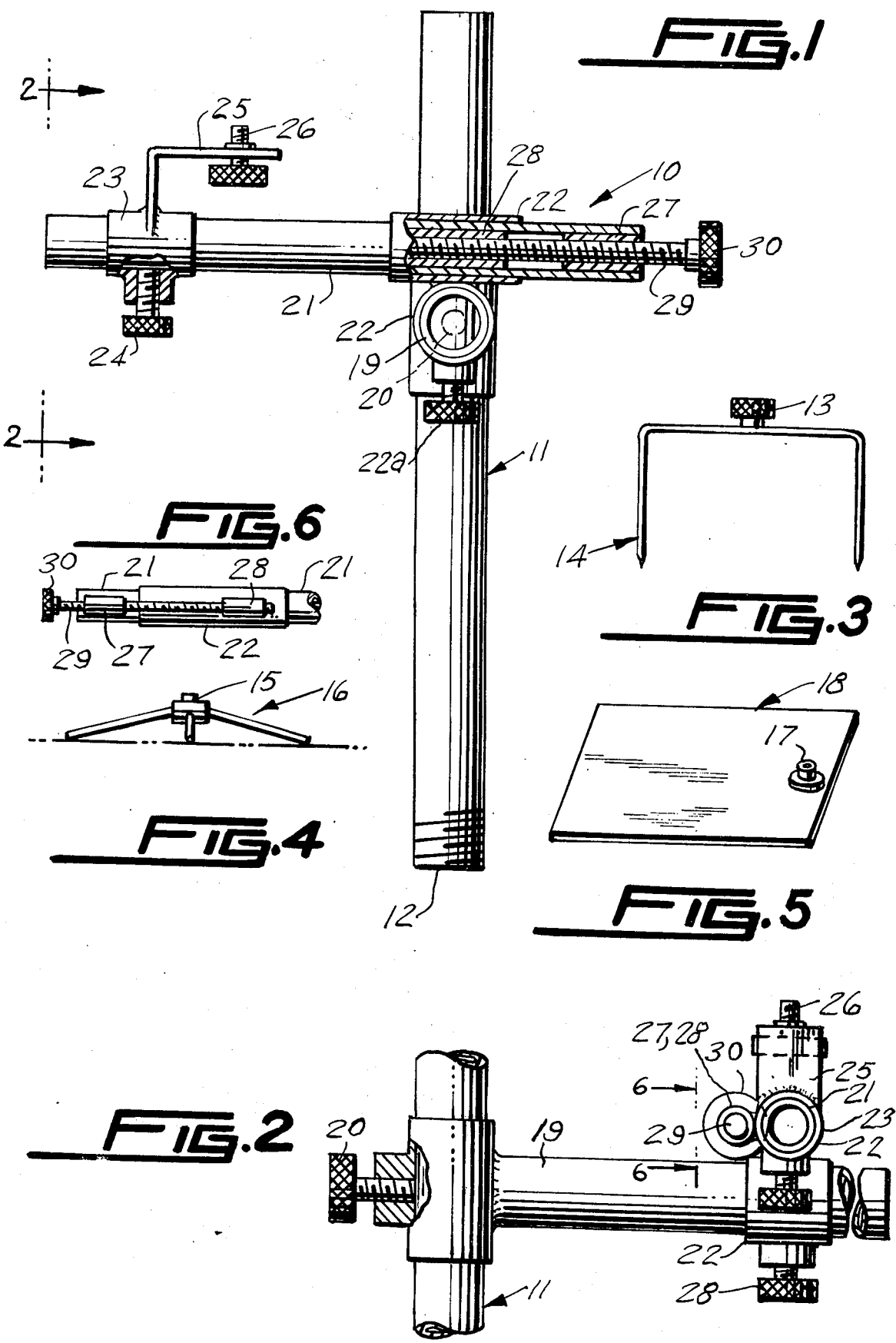

ALL ANGLE CAMERA MOUNT WITH VERNIER ADJUSTMENT

This invention relates to camera support devices and more particularly to an all angle mount.

It is therefore the principal object of this invention to provide an all angle mount which will be particularly adaptable for close up photography and copy work where it is essential that the camera be held rigid.

Another object of this invention is to provide a device of the type described, which will enable the camera to be positioned at any angle without moving or shifting the camera support, the particular angle desired being accomplished with a minimum of effort and time.

Another object of this invention is to provide a device of the type described, which will be of such structure so as to have various arms and brackets which will be adjustable upwards and downwards, forwards and backwards, and will rotate 360°.

A further object of this invention is to provide a device of the type described, which will have vernier adjustment means for enabling the camera to be moved forward and backward for fine focus, as this is the most efficient way to bring the object being photographed, into sharp focus, once the lens magnification of the object is obtained.

A still further object of this invention is to provide a device of the type described, which will have the mast portion adaptable to be threaded into the mount mast of a ground spike, a flat table or a tripod of low silhouette configuration.

Other objects of this invention are to provide an all angle mount device which is simple in design, inexpensive to manufacture, rugged in construction, easy to use and efficient in operation.

These and other objects will be readily evident upon a study of the following specification and the accompanying drawing, wherein:

FIG. 1 is a front view of the present invention shown in elevation and partly broken away.

FIG. 2 is a view taken along the line 2—2 of FIG. 1.

FIG. 3 is a side view of a ground spike for mounting the device shown in FIG. 1.

FIG. 4 is a side view of a tri-pod mount for the device shown in FIG. 1.

FIG. 5 is a perspective view of a table mount for the device shown in FIG. 1.

FIG. 6 is a view taken along the line 6-6 of FIG. 2 and is shown on a smaller scale.

According to this invention, an all angle bi-pod device 10 is shown to include a mast portion 11 having an externally threaded end 12 for being received within an internally threaded mast mount 13 of a U-shaped configurated round spike 14.

It will be noted that mast 11, if desired, may be threaded into mast mount 15 of tri-pod 16 as shown in FIG. 4, and mast 11 is also adaptable for being received within the mast mount 17 of a flat table 18 as is shown in FIG. 5 of the drawing. A horizontal arm 19 is adjustably secured to mast 11 by means of knurled set screw 20 which enables arm 19 to be elevatable and rotatable throughout 360 degrees travel. A camera mount arm 21 is carried within a camera mount bracket 22 and is slidable within sleeve 23 and sleeve 23 is secured in any desired position upon mount arm 21, by means of knurled set screw 24. An L-shaped bracket 25 is secured fixedly to sleeve 23 by welding or other means and bracket 25 is provided with a narrowed set screw 26 which is receivable within the threaded socket of a camera, thus rendering the camera stationary upon device 10.

Camera mount bracket 22 is adjustable by means of knurled set screw 22a. The threaded bushing 27 is secured fixedly, in a suitable manner, to camera mount arm 21 and a bushing 28 is secured fixedly to bracket 22, the combination receiving a threaded bolt 29 having a knurled knob 30 which provides the venier adjustment means for enabling the camera, to be moved forwards and backwards for fine focus.

What I claim is:

1. A camera mount comprising:

a cylindrical mast;

a first cylindrical arm;

first connecting means attaching the first arm perpendicularly to the cylindrical mast, said first connecting means including first locking means which may be engaged to prevent relative movement between the cylindrical mast and the first arm, said first connecting means permitting axial movement of the first arm along the axis of the cylindrical mast and rotational movement around the axis of the cylindrical mast when said first locking means is not engaged;

a second cylindrical arm;

second connecting means attaching the second arm perpendicularly to the first arm, said second connecting means including second locking means which may be engaged to prevent relative movement between the first arm and the second arm, said second connecting means permitting axial movement of the second arm along the axis of the first arm and rotational movement around the axis of the first arm when said second locking means is not engaged;

vernier adjustment means for accurately moving the second arm along its axis when said second locking means is either engaged or disengaged, said vernier adjustment means being attached to said second arm and to said second connecting means;

a camera mounting bracket; and third connecting means attaching the mounting bracket to the second arm, said third connecting means including third locking means which may be engaged to prevent relative movement between the second arm and the mounting bracket, said third connecting means permitting axial movement of the mounting bracket along the axis of the second arm and rotational movement around the axis of the second arm when said third locking means is not engaged.

* * * * *